United States Patent [19]
Gaudreau

[11] Patent Number: 5,629,798
[45] Date of Patent: May 13, 1997

[54] STEREOSCOPIC DISPLAYING METHOD AND DEVICE

[76] Inventor: Jean E. Gaudreau, 50 Place Crémazie, Suite 723, Montréal (Quëbec), Canada, H2P 2T4

[21] Appl. No.: 612,204

[22] Filed: Mar. 7, 1996

Related U.S. Application Data

[63] Continuation of Ser. No. 353,423, Dec. 9, 1994, abandoned.

[51] Int. Cl.$^6$ .................. G02B 27/46; G02F 1/1335; H04N 13/00
[52] U.S. Cl. ............................... 359/465; 348/58
[58] Field of Search ........................ 359/464, 465; 348/58

[56] References Cited

U.S. PATENT DOCUMENTS

| | | | |
|---|---|---|---|
| 3,858,001 | 12/1974 | Bonne | 178/6.5 |
| 4,719,507 | 1/1988 | Bos | 358/92 |
| 4,792,850 | 12/1988 | Liptoh et al. | 358/92 |
| 4,953,949 | 9/1990 | Dallas | 350/130 |
| 5,007,715 | 4/1991 | Verhulst | 350/334 |
| 5,050,961 | 9/1991 | Venolia | 359/465 |
| 5,113,285 | 5/1992 | Franklin et al. | 359/465 |
| 5,264,964 | 11/1993 | Faris | 359/465 |
| 5,331,358 | 7/1994 | Schurle et al. | 359/464 |

FOREIGN PATENT DOCUMENTS

| | | | |
|---|---|---|---|
| 63-274918 | 11/1988 | Japan | 359/464 |
| 63-274922 | 11/1988 | Japan | 359/465 |
| 63-274921 | 11/1988 | Japan | 359/465 |
| 63-305322 | 12/1988 | Japan | 359/465 |
| 63-305323 | 12/1988 | Japan | 359/465 |
| 1-54414 | 3/1989 | Japan | 359/464 |

*Primary Examiner*—Jon W. Henry
*Attorney, Agent, or Firm*—Quarles & Brady

[57] ABSTRACT

A method and device for displaying, on a single display surface, two different images. Each picture element on the display surface transmits information about the two displayed images. The viewer wears polarizing spectacles having cross polarized lens. The device uses polarizing filters and LCDs to rotate the polarized light and bring this polarized light in a predetermined angle so as to present an independent intensity to each eye of the viewer.

11 Claims, 3 Drawing Sheets

STEREOSCOPIC DISPLAYING METHOD AND DEVICE

This is a continuation of application Ser. No. 08/353,423 filed Dec. 9, 1994 now abandoned.

FIELD OF THE INVENTION

The invention relates to stereoscopic video display systems that transmit, on each picture element of a display surface, the information needed to visualise the two images required to create the visual effect of a three-dimensional image. More particularly, this invention relates to such video display systems using liquid crystal display (LCD) devices.

BACKGROUND OF THE INVENTION

Depth is perceived when the two eyes of a viewer see slightly different images of a three-dimensional (3-D) scene because they are spaced apart from one another. The brain analyses these two slightly different images and extracts information relating to the depth of the 3-D scene viewed.

The prior art is replete with techniques for producing 3-D images from two-dimensional (2-D) displays. These techniques may be generally divided into two major classes: the auto-stereoscopic class which produces 3-D images which may be viewed freely without wearing spectacles, and the binocular stereoscopic class which produces 3-D images which require the viewer to wear spectacles.

The auto-stereoscopic systems, while being interesting since no spectacles are necessary, suffer a major drawback; the position of the eyes of the viewer must remain in a predetermined position, relative to the display device in order to provide the 3-D effect. An example of such system is described in U.S. Pat. No. 4,953,949 issued on Sep. 4, 1990 to William J. DALLAS.

The binocular stereoscopic systems may be sub-divided in two categories: one using active spectacles, the other using passive spectacles.

Binocular stereoscopic systems using active spectacles operate on a relatively simple principle. Two slightly different images necessary to create a 3-D effect are successively projected by a 2-D display device. The spectacles are synchronized with the display device so that, when the first image is projected, one of the eyes may see it and, when the second image is projected, the other eye may see it. If the repetition rate is sufficiently high, the retinal persistence of the eyes will give the impression that both images are seen at the same time and the brain will interpret these two images as if they were two different views of a 3-D scene as usually viewed by the eyes, thus reconstructing the depth of the 3-D scene.

Binocular stereoscopic systems using passive spectacles have a different principle of operation. One of the images displayed is polarized along a first direction and the other image displayed is polarized along a second direction, usually perpendicular to the first direction. The spectacles comprise one lens having a polarizing filter along the first direction in front of one eye, and another lens having a polarizing filter along the second direction in front of the other eye. Thus, the right eye sees only one of the two projected images and the left eye sees only the other projected image. Again, the brain will interpret these two images as if they were the normal visualisation of a 3-D scene by the eyes.

Many methods for displaying two images on a display device have been developed for binocular stereoscopic systems using passive spectacles.

The two images may be projected by two cathode ray tubes (CRT), filtered with opposite direction polarizing filters and combined through a half-reflective mirror. This technique is expensive and the viewer must be at a specific location to perceive the 3-D effect.

The two images may be projected successively on a CRT display having a LCD shutter installed in front of it. When the first image is displayed, the LCD allows the light, which lies in a first direction, to pass through. When the second image is displayed, the LCD allows the light, which lies in a second direction, to pass through. The second direction is usually perpendicular to the first direction. The passive spectacles have one lens having a polarizing filter along the first direction and the other lens having a polarizing filter along the second direction. Each eye will see a different image and the brain will combine them as previously discussed. The drawback of this technique is the high costs associated with the LCD shutter that must be at least of the same size as the display surface and must have a fast response time between each change of polarization directions.

Another method to display two images on the same screen while using passive spectacles to separate them consist in producing, on a display device, a single composite image formed from the two slightly different images. The method of formation of this composite image may vary. One example of formation of the composite image consists in slicing the two images into narrow strips and forming the composite image by the successive side-by-side concatenation of these narrow strips. Polarizing filters are placed in front of the display surface to polarize the strips coming from the first image along a first direction and to polarize the strips coming from the second image along a second direction, usually perpendicular to the first direction. One problem with this technique is that the resolution of each of the images is, at best, one half of the resolution of the display device, leading to images of lesser quality or to expensive display devices having a higher resolution. An example of such system may be found described in U.S. Pat. No. 5,050,961 issued on Sep. 24, 1991 to Daniel S. VENOLIA.

OBJECTS OF THE INVENTION

An object of the present invention is therefore to overcome the above discussed drawbacks of the prior stereoscopic video display systems.

SUMMARY OF THE INVENTION

More specifically, in accordance with the present invention, there is provided a method for simultaneously displaying on a display surface formed of a plurality of picture elements, first and second numerical images formed of a plurality of pixels, wherein said first and second images are registered pixel by pixel, said method comprising the steps of adjusting, for each picture element on said display surface, the intensity of light as a function of the intensity value of two registered pixels of said first and second images, and polarizing, for each picture element on said display surface, the adjusted light along a first direction, said first direction being determined so that (a) a portion of the polarized light along a second predetermined direction has an intensity corresponding to the intensity of the registered pixel of one of said first and second images and (b) a portion of the light along a third predetermined direction, substantially perpendicular to said second direction, has an intensity corresponding to the intensity of the registered pixel of the other of said first and second images, whereby one of said first and second images may be visualised by polarizing said adjusted and polarized light in said second direction and the other of said first and second images may be visualised by polarizing said adjusted and polarized light in said third direction.

The essence of the invention consists of polarizing a previously intensity adjusted point of light along a first direction so that a first portion of this polarized point of light lying in a second direction and a second portion of this polarized point of light lying in a third direction, substantially perpendicular to said second direction, have the intensities of corresponding pixels of first and second displayed images respectively.

In the present disclosure and in the appended claims, (a) the term "picture element" is intended to define the smallest distinguishable and resolvable area of a display surface, and (b) the term "pixel" is intended to define the information needed to display a picture element.

According to another aspect of the present invention, there is provided a display device for simultaneously displaying, on a display surface formed of a plurality of picture elements, first and second numerical images formed of a plurality of pixels, wherein said first and second images are registered pixel by pixel, said device comprising:

adjustable light generating means for generating, for each picture element on said display surface, a point of light having an intensity which is a function of the intensity value of the two registered pixels of said first and second images; and polarizing means for polarizing each said point of light along a first direction determined so that (a) a portion of the polarized light along a second predetermined direction has an intensity corresponding to the intensity of the registered pixel of one of said first and second images and (b) a portion of the light along a third predetermined direction, substantially perpendicular to said second direction, has an intensity corresponding to the intensity of the registered pixel of the other said first and second images, whereby one of said first and second images may be visualised by polarizing said adjusted and polarized light in said second direction and the other of said first and second images may be visualised by polarizing said adjusted and polarized light in said third direction.

In accordance with a preferred embodiment of the display device, the adjustable light generating means comprise:

a light generating means;

a first polarizing filter for polarizing the light generated by said light generating means in an arbitrary direction;

a first LCD device for rotating, for each picture element in said display surface, the polarized light so that a portion of the rotated light along a predetermined direction has an intensity which is a function of the intensity of the two registered pixels of said first and second images.

In accordance with a further preferred embodiment of the display device, the polarizing means comprise:

a second polarizing filter for polarizing said adjusted light along an arbitrary direction;

a second LCD device for rotating, for each picture element on said display surface, the polarized adjusted light along a first direction determined so that (a) a portion of the polarized light along a second predetermined direction has an intensity corresponding to the intensity of the registered pixel of one of the two images and (b) a portion of the light along a third predetermined direction, substantially perpendicular to said second direction, has an intensity corresponding to the intensity of the registered pixel of the other of the two images.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENT

Figure 1:
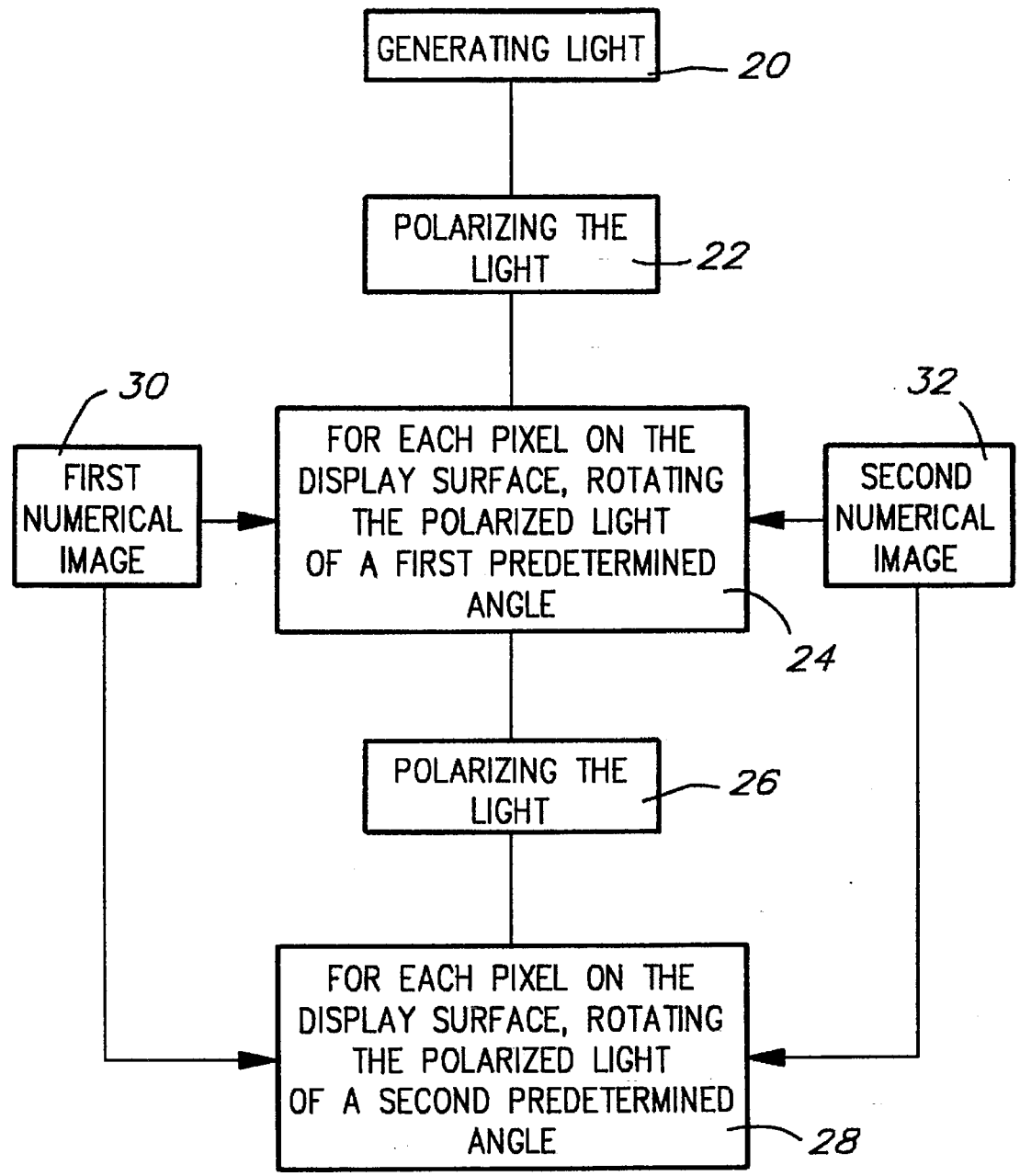
FIG. 1 is a flow chart of the steps of the displaying method of the present invention.

Referring now to FIG. 1 of the appended drawings, the steps of the method for generating two slightly different images formed of a plurality of pixels on a single display surface formed of a plurality of picture elements of the present invention will be described.

The first step 20 consists in generating the light that will ultimately form the two images on a screen.

This step is followed by a polarization step 22. For reasons of clarity, the directions of polarization will be referred to as vertical, horizontal, or as an angle taken clockwise from the vertical. It is also to be understood that the description of the method and of the device of the present invention will be given following a convention of polarization directions but that this convention is not to be considered limitative of the present invention. Hence, by convention, light is vertically polarized at step 22.

The next step 24 consists in rotating, for each picture element on the display surface, the light polarized at step 22 of a first predetermined angle. This angle will not be the same for each picture element. For each picture element, the first predetermined angle will be a function of the intensity of the two registered pixels of the first numerical image 30 and the second numerical image 32 corresponding to this particular picture element. More particularly, the first predetermined angle will be a function of:

$$\arccos(\sqrt{L^2 + R^2})  \qquad (1)$$

where L is the intensity of the pixel of the first numerical image 30 and R is the intensity of the pixel of the second numerical image 32.

Step 24 is repeated for each picture element on the display surface and consists in calculating a first predetermined angle and in rotating the polarized light of this first predetermined angle for each picture element.

The rotated light is then polarized vertically (by convention) at step 26. This vertical polarization step 26 may be viewed as a projection of the rotated light on a vertical axis, or from a mathematical point of view as the cosine trigonometry function. The intensity of the resulting light will be, along a vertical axis, a function of:

$$\sqrt{L^2+R^2} \quad (2)$$

The last step of the method involves a second rotation of the light of a second predetermined angle. Again, this second predetermined angle will not be the same for each picture element. For each picture element, the second predetermined angle will be a function of the intensity of two registered pixels corresponding to this particular picture element. The second predetermined angle is determined according to the following equation:

$$\arctan\left(\frac{L}{R}\right) \quad (3)$$

Again, L is the intensity of the pixel of the first numerical image 30 and R is the intensity of the pixel of the second numerical image 32.

Steps 24 and 26 together may be viewed as a module determining step since the angle of rotation of step 24 is determined so that the light exiting step 26 has a intensity (module) determined by the intensities of the two registered pixels of the first numerical image 30 and the second numerical image 32.

Step 28 rotates the light having a determined module of an angle determined so that (a) the projection of the rotated light on a horizontal axis has an intensity which is a function of the pixel of one of the first and second numerical images, and (b) the projection of the rotated light on a vertical axis has an intensity which is a function of the pixel of the other of the first and second numerical images.

In complex number notation (module, angle), the output of the display device will be, for each picture element:

$$\left(\sqrt{L^2+R^2}, \arctan\left(\frac{L}{R}\right)\right) \quad (4)$$

If the viewer looking at the display device wears spectacles having one lens vertically polarizing the light and the other lens horizontally polarizing the light, one eye will see the first image and the other eye will see the second image. Indeed, the eye having the vertically polarizing lens, acting as a cosine trigonometric function, will see:

$$\cos\left(\sqrt{L^2+R^2}, \arctan\left(\frac{L}{R}\right)\right) = L \quad (5)$$

and the eye having the horizontally polarizing lens, acting as a sine trigonometric function, will see:

$$\sin\left(\sqrt{L^2+R^2}, \arctan\left(\frac{L}{R}\right)\right) = R \quad (6)$$

The viewer will see a different image with each eye. If these images are adequate, the viewer's brain will generate a 3-D image.

As it will be apparent to one of ordinary skills in the art, the intensity of each pixel of the two displayed images must be limited. Indeed, when the first image displays a white dot (maximum intensity) and the second image displays a black dot (minimum intensity), the intensity of the white dot displayed by the first image must be equal to the intensity of a white dot that would be displayed by the two images simultaneously. The images should be pre-processed so as to scale the intensities of the pixels.

Although the method has been described in a monochrome environment, it is believed within the reach of one of ordinary skills in the art to apply the above described method to color display systems by the separation of colors or by other color techniques. Similarly, it is believed within the reach of one of ordinary skills in the art to apply the above described method to LCD devices used in conjunction with overhead projectors and to other types of projectors.

It is to be noted that the vertical direction of the polarizations steps 22 and 26 could be other than vertical. In fact, they could be of any direction but the polarization of the lens of the spectacles must be modified accordingly so as to have one lens polarizing the light in the direction of the polarization steps 22 and 24 and the other lens polarizing the light in a direction perpendicular to the direction of the polarization steps 22 and 24. By doing this modification, the formulas given hereinabove would not need modification.

Referring now to FIGS. 2–8, the display device for simultaneously displaying two different images will be described.

Figure 2:
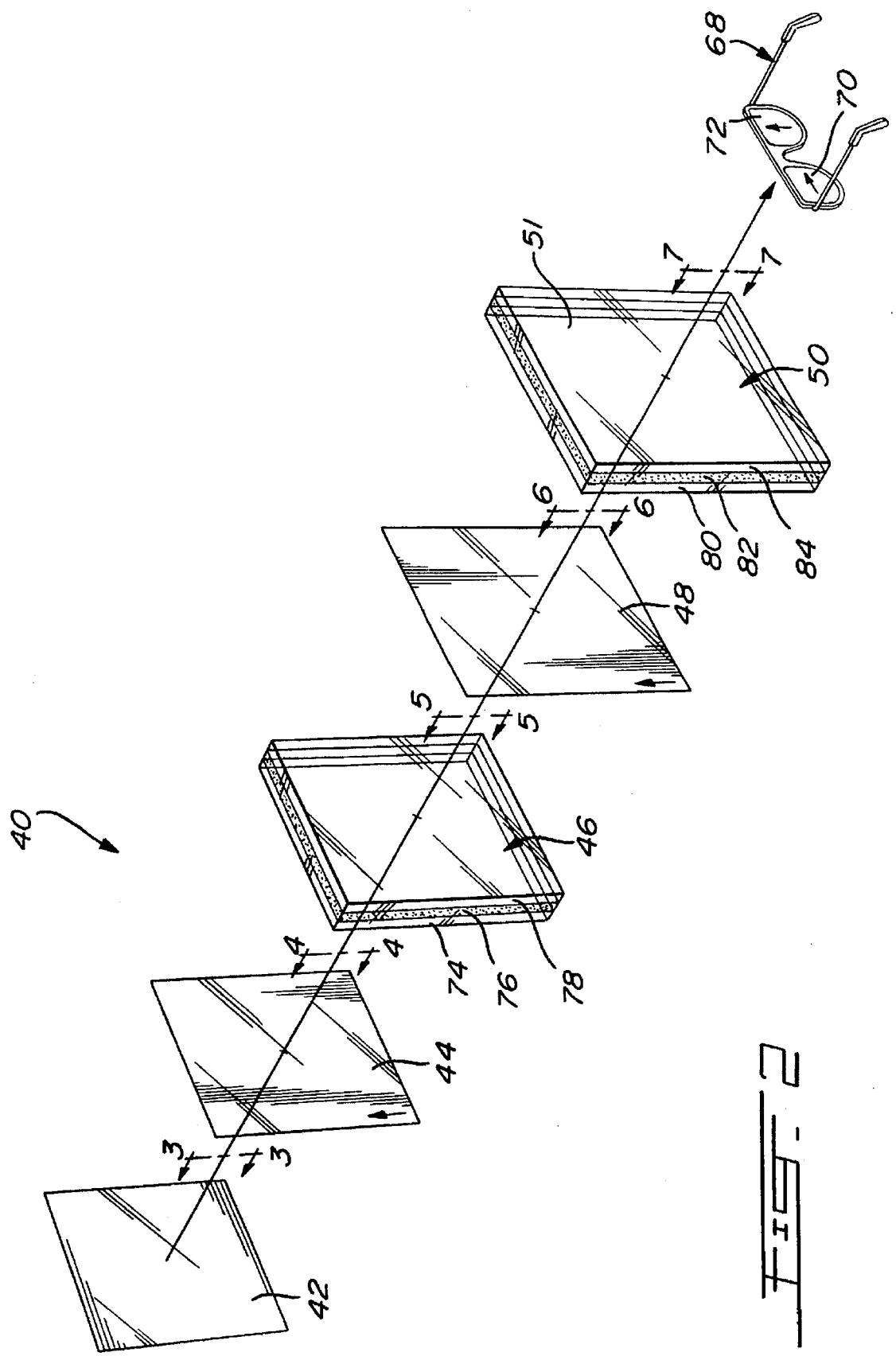
FIG. 2 is a schematic exploded view of the device for displaying images of the present invention.

FIG. 2 schematically illustrates a preferred embodiment of the display device 40 in an exploded view. The display device 40 comprises five elements: a light source 42, a first polarizing filter 44, a first LCD 46, a second polarizing filter 48 and a second LCD 50.

As will be readily apparent to one of ordinary skill in the art, an output surface of the second LCD 50 defines a display surface 51 formed by an array of picture elements (not shown). The size of each picture element will be defined by the smallest distinguishable and resolvable area of the first and second LCDs 46 and 50. As will be described hereinafter, by means of an appropriate rotation of the light, each picture element may simultaneously display a pixel of a first image and a pixel of a second image.

The light source 42 may be a backlighting light source usually used in conventional displays found in portable computers or any similar light source. Of course, the intensity of light source 42 is preferably uniform over its entire surface.

Figure 3:
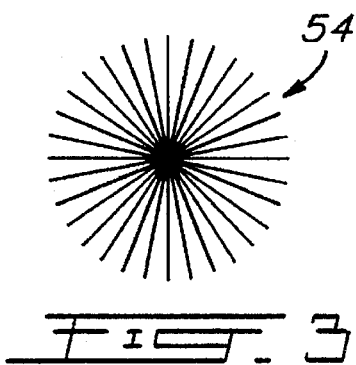
FIG. 3 is a cross-sectional view taken along lines 3—3 of FIG. 2.

FIG. 3, which is a cross-sectional view taken along line 3—3 of FIG. 2, illustrates a front view of a light ray 54, generated by light source 42. At this point, the light is unpolarized and extends in every direction.

The first polarizing filter 44 (FIG. 2) vertically polarizes the light generated by light source 42. As discussed hereinabove, the angle of polarization of filter 44 is not essentially vertical but could be any angle. The angles given herein have been chosen to simplify the description.

Figure 4:
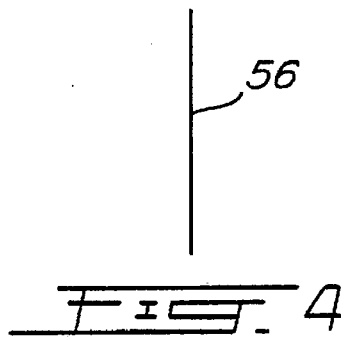
FIG. 4 is a cross-sectional view taken along lines 4—4 of FIG. 2.

FIG. 4, which is a cross-sectional view taken along line 4—4 of FIG. 2, illustrates a front view of a light ray 56, generated by light source 42 and polarized by polarizing filter 44. At this point the light is vertically polarized and extends only in the vertical direction.

The basic principle of a LCD is believed to be well known; consequently, only a brief description will be given here. A LCD is an optically passive device whose operation depends on the ability of the liquid crystal to rotate plane polarized light. Some liquid crystal, 76 or 82 in LCD 46 and 50 respectively, is hermetically sealed between two glass plates 74, 78 or 80, 84 in LCD 46 and 50 respectively. A transparent electrode (not shown) is etched on the surface of each glass plate. The rotation of the plane polarized light is a function of the electric field applied between the electrodes.

Returning to FIG. 2, the vertically polarized light then passes through a first LCD 46. For each picture element of the display surface, LCD 46 will rotate the polarized light of an angle determined so that the resulting rotated light has a vertical component which is a function of the intensity of the registered pixels of the first and second numerical images corresponding to the particular picture element.

Figure 5:
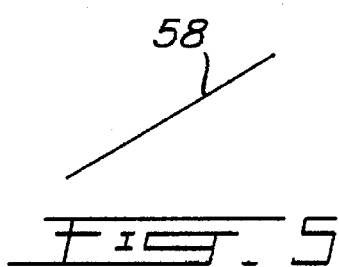
FIG. 5 is a cross-sectional view taken along lines 5—5 of FIG. 2.

FIG. 5 which is a cross-sectional view taken along line 5—5 of FIG. 2, illustrates a front view of a light ray 58, generated by light source 42, polarized by polarizing filter 44 and rotated by LCD 46. It is to be noted that the angle of rotation of light ray 58, illustrated in FIG. 5, is arbitrary and is chosen for illustration purposes only.

Figure 6:
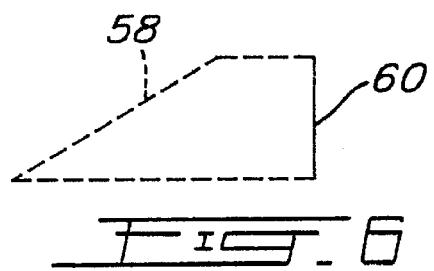
FIG. 6 is a cross-sectional view taken along lines 6—6 of FIG. 2.

The rotated light is then vertically polarized by a second polarizing filter 48 (FIG. 2). FIG. 6, which is a cross-sectional view taken along line 6—6 of FIG. 2, illustrates, in solid line, a front view of a light ray 60, generated by light source 42, polarized by polarizing filter 44, rotated by LCD 46 and polarized by polarizing filter 48. This figure also illustrates, in dashed lines, the effect of polarizing filter 48 on light ray 58. The effect of filter 48 may be viewed as a projection on a vertical axis of ray 58 (as illustrated in dashed lines).

Finally, the vertically polarized light passes through a second LCD 50. For each picture element of the display surface, LCD 50 will rotate the polarized light of a second angle, determined so that the resulting rotated light has a vertical component which is a function of the intensity of a pixel of one of the first and second images displayed, and has a horizontal component which is a function of the intensity of a pixel of the other of the first and second images displayed.

Figure 7:
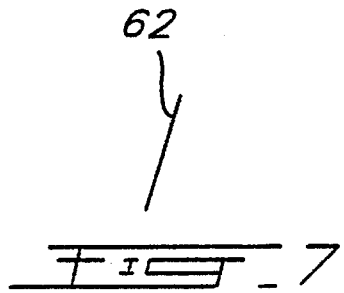
FIG. 7 is a cross-sectional view taken along lines 7—7 of FIG. 2.

FIG. 7, which is a cross-sectional view taken along line 7—7 of FIG. 2, illustrates a front view of a light ray 62, generated by light source 42, polarized by polarizing filter 44, rotated by LCD 46, polarized by polarizing filter 48 and rotated by LCD 50. It is to be noted that the angle of rotation of light ray 62, illustrated in FIG. 7, is arbitrary and is chosen for illustration purposes only.

Figure 8:
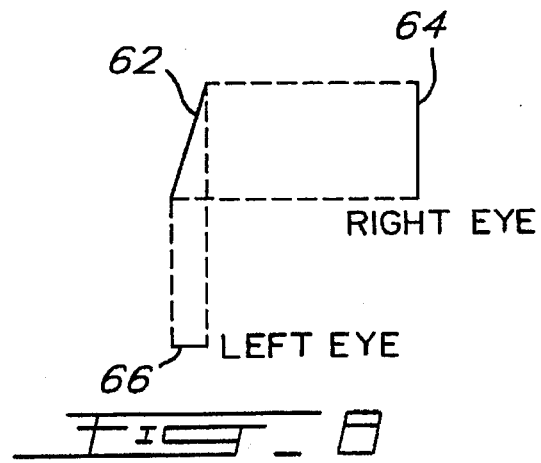
FIG. 8 is a geometrical construction illustrating the intensity of light perceived by each eye.

Returning to FIG. 2 which also illustrates a pair of spectacles 68 having one lens 70 which horizontally polarizes the light and the other lens 72 which vertically polarizes the light. The rotated light exiting LCD 50 is decomposed by spectacles 68 as illustrated in FIG. 8. Lens 70 has an effect, on light ray 62, which may be viewed as a projection of ray 62 on a horizontal axis to yield ray 66 which is viewed by the left eye. Lens 72 has an effect, on light ray 62, which may be viewed as a projection of ray 62 on a vertical axis to yield ray 64 which is viewed by the right eye.

As will be apparent to one of ordinary skills in the art, the angles of rotation of the light forming each picture element imparted by LCD 46 and LCD 50 may be calculated from the known intensities of the registering pixels of the two images to be displayed by a computing device (not shown).

Again, for reasons discussed hereinabove, the images should be pre-processed so as to scale the intensities of the pixels.

The device has been described in a monochrome environment, it is believed to be within the reach of one of ordinary skills in the art to make modifications to the device described herein so as to display color images by the separation of colors, by the use of active matrix display technology or by any other suitable technology. As a non-limitative example, if a RGB-like technology is used, the three colors (Red, Green, Blue) displayed for each picture element could be polarized and rotated independently.

As will be understood by one of ordinary skills in the art, the two images displayed may be numerically generated images or analog images that have been digitized.

Although the present invention has been described hereinabove by way of preferred embodiments thereof, it can be modified, without departing from the spirit and nature of the subject invention as defined in the appended claims. For example, steps 20, 22 and 24 of the method illustrated in FIG. 1 could be combined in a single step if, instead of generating a light of uniform intensity in step 20, a matrix of relatively small electroluminescent diodes (LED) or the like was used to each generate light that would already have an intensity which would be a function of the intensities of the registered pixels of the first and second images to be displayed. The light could then be polarized and rotated as previously discussed. In the same general idea, elements 42, 44 and 46 of FIG. 2 could be replaced by a conventional CRT display to generate light having the adequate intensity. However, it is recognised that the precise alignment of LCD 50 over such a CRT will require some difficult adjustment since the display surface of a CRT is not flat. Similarly, elements 42, 44 and 46 of FIG. 2 could be replaced by a plasma display or by a Field Emission Display (FED) which present a flat display surface simplifying the precise alignment of LCD 50.

What is claimed is:

1. A method for concurrently displaying first and second numerical images on a display surface, said first and second images being formed of respective identical arrays of pixels of variable light intensity, said display surface being formed of an array of picture elements for displaying the pixels of the first and second numerical images, said method comprising, for each picture element of said display surface, the steps of:

supplying light to said picture element;

selecting a corresponding pixel of said first image and a corresponding pixel of said second image;

polarizing the light supplied to said picture element in a first predetermined direction;

rotating the light polarized in said first direction by a first rotation angle which is calculated according to the function:

$$A1 = \arccos(\sqrt{L^2 + R^2})$$

where A1 is the first rotation angle, L is the light intensity of the corresponding pixel of the first image, and R is the light intensity of the corresponding pixel of the second image; wherein the resulting rotated polarized light comprises, in a second predetermined direction, a component having an intensity which is a function of the light intensities of said selected corresponding pixels of said first and second images;

polarizing the light which has been polarized in said first direction and rotated by said first rotation angle in said second predetermined direction;

rotating the light polarized in said second direction to orient said polarized light into a displaying direction in which (a) a first component of the rotated polarized light in a first predetermined viewing direction corresponds to the light intensity of the selected corresponding pixel of the first numerical image and (b) a second component of the rotated polarized light in a second predetermined viewing direction, substantially perpendicular to said first viewing direction, corresponds to the light intensity of the selected corresponding pixel of the second numerical image, whereby concurrent display of said first and second numerical images on said display surface is carried out, for each picture element, through combination of said selected corresponding pixels of said first and second images into a polarized and rotated light which may be decomposed, through further adequate polarization along said first and second predetermined viewing directions, into said corresponding pixel of said first numerical image and said corresponding pixel of said second numerical image, respectively.

2. The method for concurrently displaying first and second numerical images as defined in claim 1, wherein said first predetermined direction and said second predetermined direction are substantially parallel.

3. The method for concurrently displaying first and second numerical images as defined in claim 1, wherein said rotation of the polarized light to orient said polarized light into said displaying direction comprises rotating the light by a second rotation angle which is calculated according to the function:

$$A2 = \arctan\left(\frac{L}{R}\right)$$

where A2 is the second rotation angle.

4. A display device for concurrently displaying first and second numerical images, said first and second images being formed of respective identical arrays of pixels of variable light intensity, said display device comprising:

a display surface formed of an array of picture elements for displaying the pixels of the first and second numerical images;

light generating means for supplying light to each said picture element;

intensity adjusting means for adjusting the intensity of the light supplied to each said picture element as a function of the intensity of (a) a selected corresponding pixel of said first image and (b) a selected corresponding pixel of said second image; said intensity adjusting means including:

a polarizing filter for polarizing the light supplied by said light generating means in a first predetermined direction; and first light rotating means for rotating the light polarized in said first direction by a first rotation angle which is calculated according to the function:

$$A1 = \arccos(\sqrt{L^2 + R^2})$$

where A1 is the first rotation angle, L is the light intensity of the corresponding pixel of the first image and R is the light intensity of the corresponding pixel of the second image, wherein the resulting rotated polarized light comprises, in a second predetermined direction, a component having an intensity which is a function of the light intensities of said selected and corresponding pixels of said first and second images;

polarizing means for polarizing said intensity adjusted light along said second predetermined direction;

second light rotating means for rotating the polarized light to orient said polarized light into a displaying direction in which (a) a first component of the rotated polarized light in a first predetermined viewing direction corresponds to the light intensity of the selected corresponding pixel of the first numerical image and (b) a second component of the rotated polarized light in a second predetermined viewing direction, substantially perpendicular to said first viewing direction, corresponds to the light intensity of the selected corresponding pixel of the second numerical image, whereby concurrent display of said first and second numerical images on said display surface is carried out, for each picture element, through combination of said selected corresponding pixels of said first and second images into a polarized and rotated light which may be decomposed, through further adequate polarization along said first and second predetermined viewing directions, into said corresponding pixel of said first numerical image and into said corresponding pixel of said second numerical image, respectively.

5. The display device for concurrently displaying first and second numerical images as defined in claim 4, wherein said first light rotating means includes a LCD device.

6. The display device for concurrently displaying first and second numerical images as defined in claim 4, wherein said second light rotating means includes a LCD device.

7. The display device for concurrently displaying first and second numerical images as defined in claim 4, wherein said first predetermined direction and said second predetermined direction are substantially parallel.

8. The display device for concurrently displaying first and second numerical images as defined in claim 4, wherein said second light rotating means includes means for rotating the light by a second rotation angle which is calculated according to the function:

$$A2 = \arctan\left(\frac{L}{R}\right)$$

where A2 is the second rotation angle.

9. A method for concurrently displaying first and second numerical images on a display surface, said first and second images being formed of respective identical arrays of pixels of variable light intensity, said display surface being formed of an array of picture elements for displaying the pixels of the first and second numerical images, said method comprising, for each picture element of said display surface, the steps of:

supplying light to said picture element;

selecting a corresponding pixel of said first image and a corresponding pixel of said second image;

adjusting the intensity of the light supplied to said picture element as a function of the light intensities of said selected, corresponding pixels of said first and second images;

polarizing the light of which the intensity has been adjusted in a first predetermined direction;

rotating the polarized light to orient said polarized light into a displaying direction in which (a) a first component of the rotated polarized light in a first predetermined viewing direction corresponds to the light intensity of the selected corresponding pixel of the first numerical image and (b) a second component of the rotated polarized light in a second predetermined viewing direction, substantially perpendicular to said first viewing direction, corresponds to the light intensity of the selected corresponding pixel of the second numerical image, said rotation of the polarized light to orient said polarized light into said displaying direction comprises rotating the light by a rotation angle which is calculated according to the function:

$$A2 = \arctan\left(\frac{L}{R}\right)$$

where A2 is the rotation angle, L is the light intensity of the corresponding pixel of the first image, and R is the light intensity of the corresponding pixel of the second image;

whereby concurrent display of said first and second numerical images on said display surface is carried out, for each picture element, through combination of said selected corresponding pixels of said first and second images into a polarized and rotated light which may be decomposed, through further adequate polarization along said first and second predetermined viewing directions, into said corresponding pixel of said first numerical image and said corresponding pixel of said second numerical image, respectively.

10. A display device for concurrently displaying first and second numerical images, said first and second images being formed of respective identical arrays of pixels of variable light intensity, said display device comprising:

a display surface formed of an array of picture elements for displaying the pixels of the first and second numerical images;

light generating means for supplying light to each said picture element;

intensity adjusting means for adjusting the intensity of the light supplied to each said picture element as a function of the intensity of (a) a selected corresponding pixel of said first image and (b) a selected corresponding pixel of said second image;

polarizing means for polarizing said intensity adjusted light along a first predetermined direction;

light rotating means for rotating the polarized light to orient said polarized light into a displaying direction in which (a) a first component of the rotated polarized light in a first predetermined viewing direction corresponds to the light intensity of the selected corresponding pixel of the first numerical image and (b) a second component of the rotated polarized light in a second predetermined viewing direction, substantially perpendicular to said first viewing direction, corresponds to the light intensity of the selected corresponding pixel of the second numerical image, said light rotating means rotating the light by a rotation angle which is calculated according to the function:

$$A2 = \arctan\left(\frac{L}{R}\right)$$

where A2 is the rotation angle, L is the light intensity of the corresponding pixel of the first image, and R is the light intensity of the corresponding pixel of the second image; whereby concurrent display of said first and second numerical images on said display surface is carried out, for each picture element, through combination of said selected corresponding pixels of said first and second images into a polarized and rotated light which may be decomposed, through further adequate polarization along said first and second predetermined viewing directions, into said corresponding pixel of said first numerical image and into said corresponding pixel of said second numerical image, respectively.

11. The display device for concurrently displaying first and second numerical images as defined in claim 10, wherein said light rotating means includes a LCD device.

* * * * *